(No Model.)
A. L. AKINS.
MECHANICAL MOVEMENT.
No. 377,509. Patented Feb. 7, 1888.
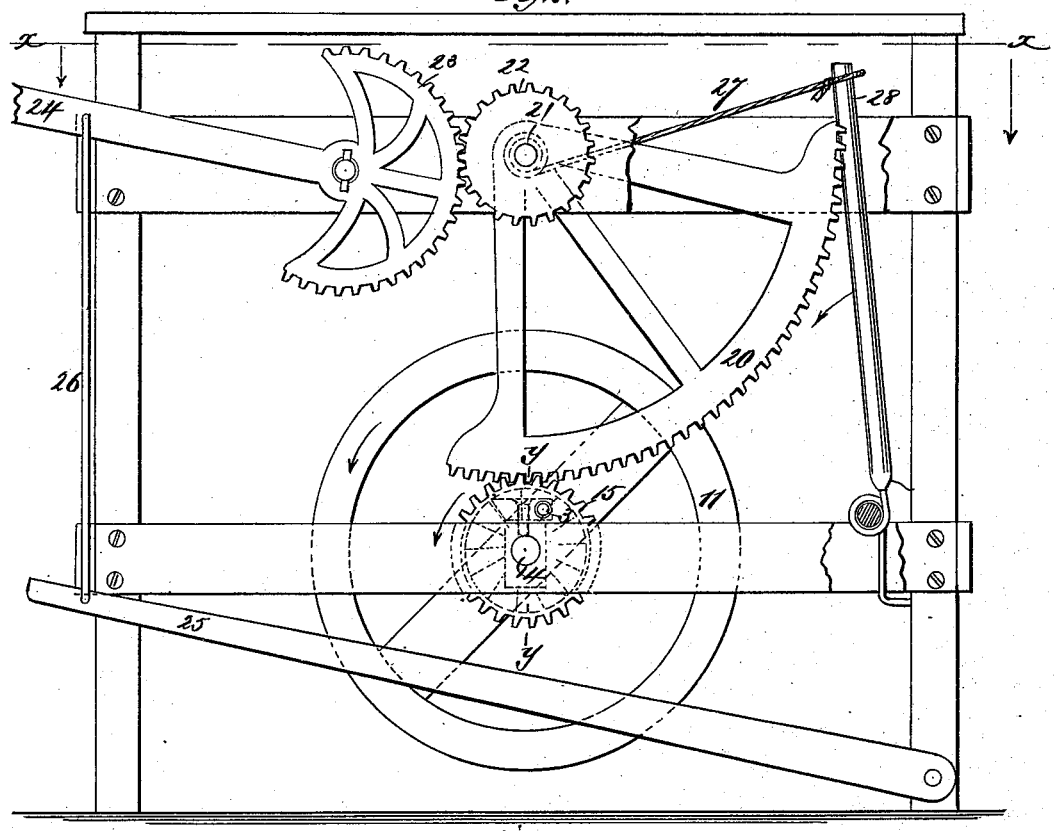
*Fig. 1.*
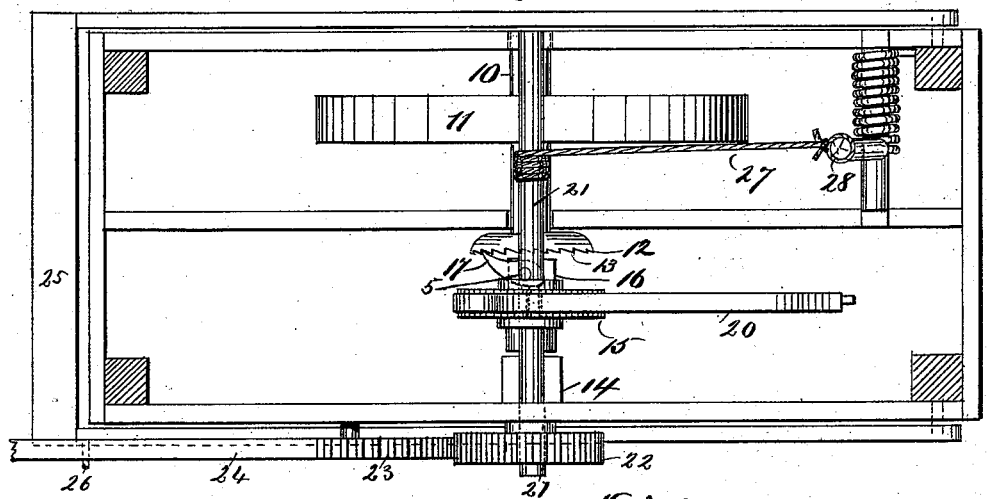
*Fig. 2.*
*Fig. 3.*
WITNESSES:
F. McArdle.
C. Sedgwick.
INVENTOR:
A. L. Akins.
BY Munn & Co.
ATTORNEYS.

UNITED STATES PATENT OFFICE.

ABRAHAM L. AKINS, OF LARIMER'S STATION, PENNSYLVANIA.

MECHANICAL MOVEMENT.

SPECIFICATION forming part of Letters Patent No. 377,509, dated February 7, 1888.

Application filed June 8, 1887. Serial No. 240,635. (No model.)

*To all whom it may concern:*

Be it known that I, ABRAHAM L. AKINS, of Larimer's Station, in the county of Westmoreland and State of Pennsylvania, have invented a new and Improved Mechanical Movement, of which the following is a full, clear, and exact description.

This invention relates to a mechanical movement that is applicable for use in the transmission of power to most any form of light machinery, the parts being so arranged that they may be driven by hand or foot.

Reference is to be had to the accompanying drawings, forming a part of this specification, in which similar figures of reference indicate corresponding parts in all the views.

Figure 1 is a side view of my mechanical movement, parts being broken away. Fig. 2 is a sectional plan view taken on line $x\ x$ of Fig. 1; and Fig. 3 is a detail view representing the arrangement of the tooth-disk and its driving-pawl, the view being taken on a line corresponding approximately with that of the line $y\ y$ of Fig. 1.

In the drawings above referred to, 10 represents a shaft, upon which there is mounted a balance-wheel, 11, and a disk, 12, in the outer side face of which there are formed teeth 13. This shaft 10 could be provided with a pulley or crank-arm, so that in revolving its motion would be transmitted to the machine which it was desired to drive.

In a line with the shaft 10 I mount a shaft, 14, which extends inward from the main frame of the machine, and upon this shaft I loosely mount a gear, 15, and a block, 16, the block carrying a pawl, 17, which is pivoted at 5 and is formed with a stem, 2, that rides in an aperture, 3, formed in the gear 15, the said aperture being larger than the stem of the pawl, so as to allow the pawl a slight movement on its pivot. The gear 15 is engaged by a large segmental gear, 20, which is carried by an upper shaft, 21, said shaft being provided with a small gear, 22, that is engaged by a segmental gear, 23, that is studded to the main frame of the machine, this gear 23 being provided with a handle, 24, which is connected to a treadle, 25, by a rod, 26.

One end of a cord, 27, is secured to the shaft 21 and the other end of this cord is connected to a spring-supported arm, 28.

Such being the general construction of the apparatus, the operation is as follows: As either the handle 24 or the treadle 25 is depressed, the gear 20 would be moved in the direction of the arrow shown in connection therewith in Fig. 1, and as this gear so moves it will carry the gear 15 in the direction of its arrow. Now, as before stated, the pawl 17 is provided with a stem, 2, which rides in an aperture, 3, formed in the gear 15, so that as the gear advances it, beginning to move a little sooner than the block 16, will turn the pawl on its pivot and carry its point outward and into engagement with one of the teeth 13 of the disk 12, thus carrying the shaft 10 forward in the direction of the arrow shown in connection with the balance-wheel 11 in Fig. 1. Then, as the pressure upon the treadle or handle 24 is released, the spring-arm 28, which as the treadle or handle was depressed was moved in the direction of its arrow, will act to return the gear 20 to about the position in which it is shown in Fig. 1, thus imparting a retrograde motion to said gear and to the gear 15; but as the gear starts to move backward it, moving sooner than the block 16, will turn the pawl on its pivot and throw the pawl 17 from engagement with the teeth 13 of the disk 12, and thus relieve said disk from the excessive wear to which it would otherwise be subjected during the retrograde movement of the pawl. Then at another downward stroke of the lever or handle the operation is repeated.

Having thus fully described my invention, I claim as new and desire to secure by Letters Patent—

1. The combination, with a shaft carrying a disk formed with a toothed face, of a loosely-mounted block carrying a pawl that is arranged to engage said toothed-face disk, a loosely-mounted gear formed with an aperture that is entered by a stem from the pawl, and a means, substantially as described, for moving the gear, as and for the purpose stated.

2. The combination, with a shaft, of a toothed-face disk, a loosely-mounted block, a pawl mounted upon said block and formed with a stem, the pawl being arranged to engage the toothed-face disk, a loosely-mounted gear provided with an aperture that is entered by the pawl-stem, a segmental gear which engages the apertured gear, a means for advancing the segmental gear, and a means for automatically returning the same, substantially as described.

3. The combination, with a shaft, 10, carrying a balance-wheel, 11, and a disk, 12, formed with teeth 13, of a shaft, 14, carrying a loosely-mounted block, 16, and a loosely-mounted gear, 15, a pawl, 17, formed with a stem, 2, which enters an aperture, 3, in the gear 15, said pawl being carried by the block 16 and arranged to engage the disk 12, a segmental gear, 20, a shaft, 21, upon which said gear is mounted, a cord, 27, connected to said shaft, a spring-arm, 28, to which the cord 27 is also connected, a gear, 22, and a segmental gear, 23, which engages the gear 22 and is provided with a handle, substantially as described.

ABRAHAM L. AKINS.

Witnesses:
BEN STEELE,
SAMUEL FINK.